United States Patent
Kweon et al.

(10) Patent No.: US 9,698,998 B2
(45) Date of Patent: Jul. 4, 2017

(54) APPARATUS AND METHOD FOR PLAYING CONTENTS IN HOME NETWORK SYSTEM

(71) Applicant: Samsung Electronics Co., Ltd., Suwon-si, Gyeonggi-do (KR)

(72) Inventors: Ji-Hyeon Kweon, Yongin-si (KR); Hyun-Suk Min, Suwon-si (KR); Kwan-Woo Song, Yongin-si (KR); Jong-Woo Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/104,505

(22) Filed: Dec. 12, 2013

(65) Prior Publication Data

US 2014/0169274 A1  Jun. 19, 2014

(30) Foreign Application Priority Data

Dec. 12, 2012 (KR) .................. 10-2012-0144765

(51) Int. Cl.
*H04L 12/28* (2006.01)

(52) U.S. Cl.
CPC ...... *H04L 12/2816* (2013.01); *H04L 12/2818* (2013.01); *H04L 12/2834* (2013.01)

(58) Field of Classification Search
CPC ..... H04L 12/56; H04L 12/28; H04L 12/2816; H04L 12/2818; H04L 12/2834; H04W 92/00; H04W 40/00; H04N 21/41
USPC ........................................ 370/328, 338, 401
See application file for complete search history.

(56) References Cited

U.S. PATENT DOCUMENTS

| | | | |
|---|---|---|---|
| 8,375,118 B2* | 2/2013 | Hao ................. | G05B 15/02 709/223 |
| 2005/0240680 A1* | 10/2005 | Costa-Requena ... | H04L 12/2803 709/250 |
| 2006/0262221 A1 | 11/2006 | Yuasa et al. | |
| 2006/0271695 A1* | 11/2006 | Lavian ................ | G06F 21/552 709/229 |

(Continued)

FOREIGN PATENT DOCUMENTS

| | | |
|---|---|---|
| JP | 2007-004773 A | 1/2007 |
| KR | 10-2011-0047764 A | 5/2011 |

(Continued)

OTHER PUBLICATIONS

Nabuo Saito, "Ecological Home Network: An Overview", Nov. 2013, Proceedings of the IEEE, vol. 101, No. 11, pp. 2428-2435.*

(Continued)

*Primary Examiner* — Chi H Pham
*Assistant Examiner* — Shailendra Kumar
(74) *Attorney, Agent, or Firm* — Jefferson IP Law, LLP

(57) ABSTRACT

Provided is a method and apparatus for controlling home devices forming a home network at a time by using a mobile terminal in a home network system. In particular, the present disclosure provides a method and apparatus for controlling home devices at a time, depending on a type of contents. A method for playing contents in a Home GateWay (HGW) in a home network system includes receiving from a mobile terminal a control command requesting continuous playback of contents that are currently played in the mobile terminal and controlling at least one home devices in response to the control command.

16 Claims, 12 Drawing Sheets

(56) References Cited

U.S. PATENT DOCUMENTS

| | | | |
|---|---|---|---|
| 2007/0061725 A1* | 3/2007 | Isaac | H04N 7/17318 715/717 |
| 2011/0106279 A1 | 5/2011 | Cho et al. | |
| 2011/0187928 A1 | 8/2011 | Crabtree | |
| 2011/0277001 A1* | 11/2011 | Kaluskar | H04L 12/2818 725/80 |
| 2012/0062796 A1* | 3/2012 | Roberts | H04N 5/4403 348/569 |
| 2012/0082150 A1* | 4/2012 | Ozawa | H04L 12/2836 370/338 |
| 2012/0166581 A1* | 6/2012 | Nakajima | H04L 12/282 709/217 |
| 2012/0244861 A1 | 9/2012 | Agarwal et al. | |
| 2012/0303137 A1* | 11/2012 | Schoeller | H04L 12/282 700/1 |

FOREIGN PATENT DOCUMENTS

| | | |
|---|---|---|
| KR | 10-2011-0131655 A | 12/2011 |
| WO | 2005/107408 A2 | 11/2005 |
| WO | 2011/035443 A1 | 3/2011 |

OTHER PUBLICATIONS

Andre Bottaro et al., Pervasive Service Composition in the Home Network, May 1, 2007.

* cited by examiner

APPARATUS AND METHOD FOR PLAYING CONTENTS IN HOME NETWORK SYSTEM

PRIORITY

This application claims priority under 35 U.S.C. §119(a) to a Korean Patent Application filed in the Korean Intellectual Property Office on Dec. 12, 2012 and assigned Serial No. 10-2012-0144765, the contents of which are incorporated herein by reference.

BACKGROUND OF THE INVENTION

Field of the Invention

The present disclosure generally relates to an apparatus and method for playing contents in a home network system.

Description of the Related Art

A home network system refers to a system in which home devices installed in home are connected over a wired or wireless network to enable communication between the home devices. An advanced home network system integrates home devices through a Home Gateway (HGW or H-GW) to connect them over an external public data network, for example, an Internet Protocol (IP) network (that is, the Internet), thus providing a wider variety of services associated with the Internet. The home network system may control home devices according to users' demands to provide services desired by the users. Conventionally, when a user-desired service is provided, a HGW controls the respective home devices by using an integrated remote controller in the home network system, such that a control procedure for each home device is complicated. For the same reason, it takes a long time for the HGW to control the home devices. As a result, a need exists for a scheme that allows a mobile terminal to control home devices forming a home network at a time in a home network system.

SUMMARY OF THE INVENTION

Problems to be Solved by the Invention

Accordingly, an aspect of the present disclosure is to provide an apparatus and method for playing contents in a home network system.

Another aspect of the present disclosure is to provide an apparatus and method for playing contents in a home network system, in which multiple home devices are controlled based on a type of contents.

Still another aspect of the present disclosure is to provide an apparatus and method for playing contents in a home network system, in which a meeting schedule window is popped up during playback of a movie.

Means for Solving Problems

In accordance with an aspect of the present disclosure, there is provided a method for playing contents in a Home GateWay (HGW) in a home network system, the method including receiving from a mobile terminal a control command requesting continuous playback of contents that are currently played in the mobile terminal and controlling at least one home devices in response to the control command.

In accordance with another aspect of the present disclosure, there is provided a method for playing contents in a HGW in a home network system, the method including receiving from a mobile terminal a control command requesting playback of contents stored in the HGW and controlling at least one home devices in response to the control command.

In accordance with still another aspect of the present disclosure, there is provided an apparatus for playing contents in a HGW in a home network system, the apparatus including a receiver configured to receive from a mobile terminal a control command requesting continuous playback of contents that are currently played in the mobile terminal and a controller configured to control at least one home devices in response to the control command.

In accordance with yet another aspect of the present disclosure, there is provided an apparatus for playing contents in a HGW in a home network system, the apparatus including a receiver for configured to receive from a mobile terminal a control command requesting playback of contents stored in the HGW and a controller configured to control at least one home devices in response to the control command.

DETAILED DESCRIPTION OF THE EXEMPLARY EMBODIMENTS

In the following description of the present disclosure, a detailed description of known functions and configurations incorporated herein will be omitted when it may obscure the subject matter of the present disclosure. Hereinafter, various embodiments of the present disclosure will be described with reference to the accompanying drawings.

Terms or words used in the specification and the appended claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

Figure 1:
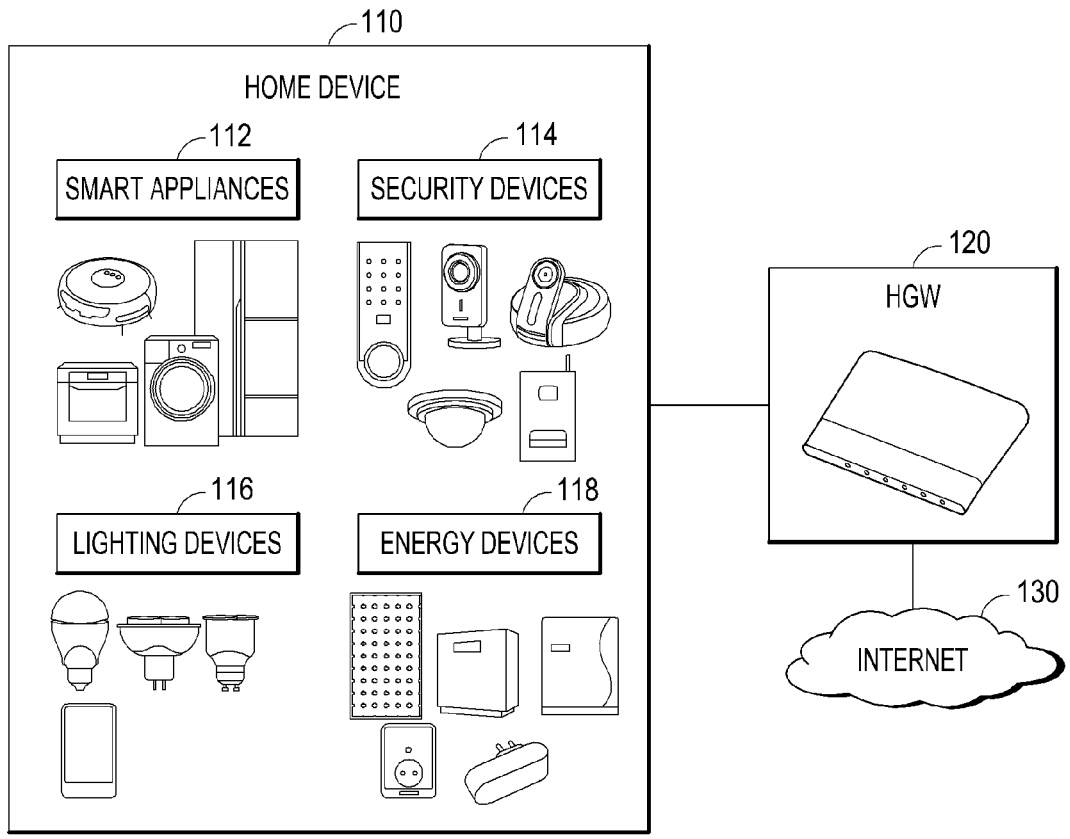
FIG. 1 is a simplified structural diagram illustrating a home network system according to an embodiment of the present disclosure.

FIG. 1 is a diagram illustrating a simplified structure of a home network system according to an embodiment of the present disclosure.

Referring to FIG. 1, a home network system may include home devices and a Home GateWay (HGW) 120 having control and communication functions. The home devices 110 may include smart appliances 112, security devices 114, lighting devices (hereinafter, referred to as "lights") 116, and energy devices 118 that are located in (or outside) home. For example, the smart appliances 112 may include a smart Television (TV), an Internet TV, a common TV, a refrigerator, a washing machine, a robot vacuum cleaner, and the like. The security devices 114 may include, for example, a door lock system, a security camera, a security sensor, and so forth. The lighting devices 116 may include, for example, a Light Emitting Diode (LED) lighting device and the like. The energy devices 118 may include, for example, a power meter, a power socket, an electric outlet, a multi-tap, and so forth. The home devices 110 may also include, for example, a Personal Computer (PC), an Internet Protocol (IP) camera, an Internet phone, a wired/wireless phone, and a mobile phone.

The home devices 110 may communicate with the HGW 120 in a wired or wireless manner, and may receive a control command from the HGW 120 and transmit requested information corresponding to the control command to the HGW 120. The HGW 120 may include communication modules for communicating with the home devices 110 based on a wired communication or a wireless communication. The HGW 120 also registers and stores information of the home devices 110 and controls operations and states of the home devices 110, collects needed information from the home devices 110, and manages the collected information. In particular, the HGW 120 is connected with a data network such as the Internet, that is, an Internet Protocol (IP) network 130, to allow connection from another communication terminal through the Internet 130, and to transmit a control signal received from the communication terminal to a corresponding home device.

The home network system structured above may provide a home entertainment service, such as an Internet TV (IPTV), a smart TV, and a Video on Demand (VoD), which use the Internet 130, a home data communication service, such as data sharing, Voice over IP (VoIP), and video communication, and a home automation service, such as remote control and remote gauge examination of electronic appliances, crime prevention, and disaster prevention. That is, the home network system connects most of the home devices 110 used inside and outside the home through a single network to control them.

The user may connect to the HGW 120 included in the home network system and to each home device through the HGW, by using wireless communication equipment, such as a mobile terminal, in remote areas. For example, the mobile terminal may be a Personal Digital Assistant (PDA) having a communication function, a smartphone, a cellular phone, a tablet computer, a laptop computer, or the like, and may connect to the home network system through a common carrier network and the Internet.

Figure 2:
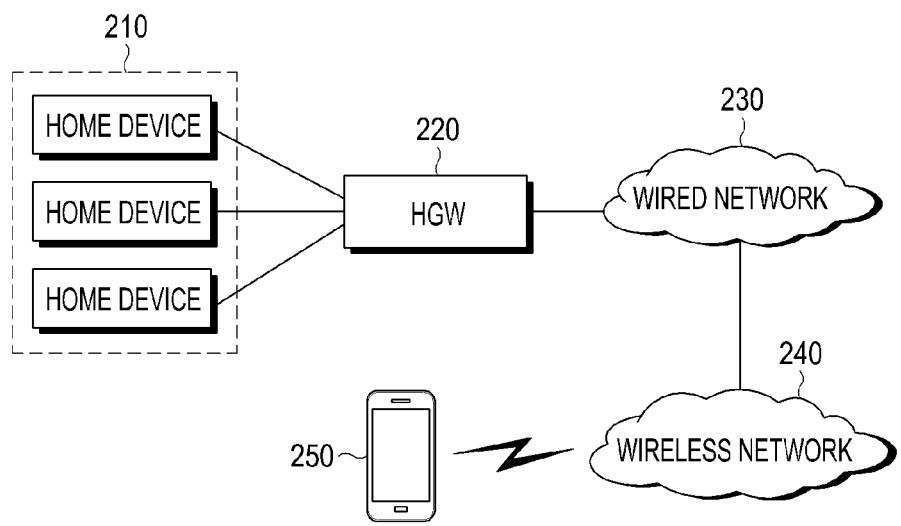
FIG. 2 is a structural diagram illustrating a home network system connectable with a mobile terminal according to an embodiment of the present disclosure.

FIG. 2 is a diagram illustrating a simplified structure of a home network system connectable with a mobile terminal according to an embodiment of the present disclosure.

Referring to FIG. 2, the home devices 110 in the home network system connects to the HGW 120 based on a wired or wireless communication. The HGW 120 connects to a wired network 230 such as the Internet. A registered mobile terminal 250 connects to a wireless network 240 including a wireless access network and a carrier core network, and accesses the HGW 220 through the wired network 230. The wireless network 240 may comply with a $2^{nd}$ Generation (2G) or $3^{rd}$ Generation (3G) cellular communication system, the $3^{rd}$ Generation Partnership Project (3GPP), a $4^{th}$ Generation (4G) communication system, the Long-Term Evolution (LTE), and World Interoperability for Microwave Access (WiMAX), or the like.

Figure 3:
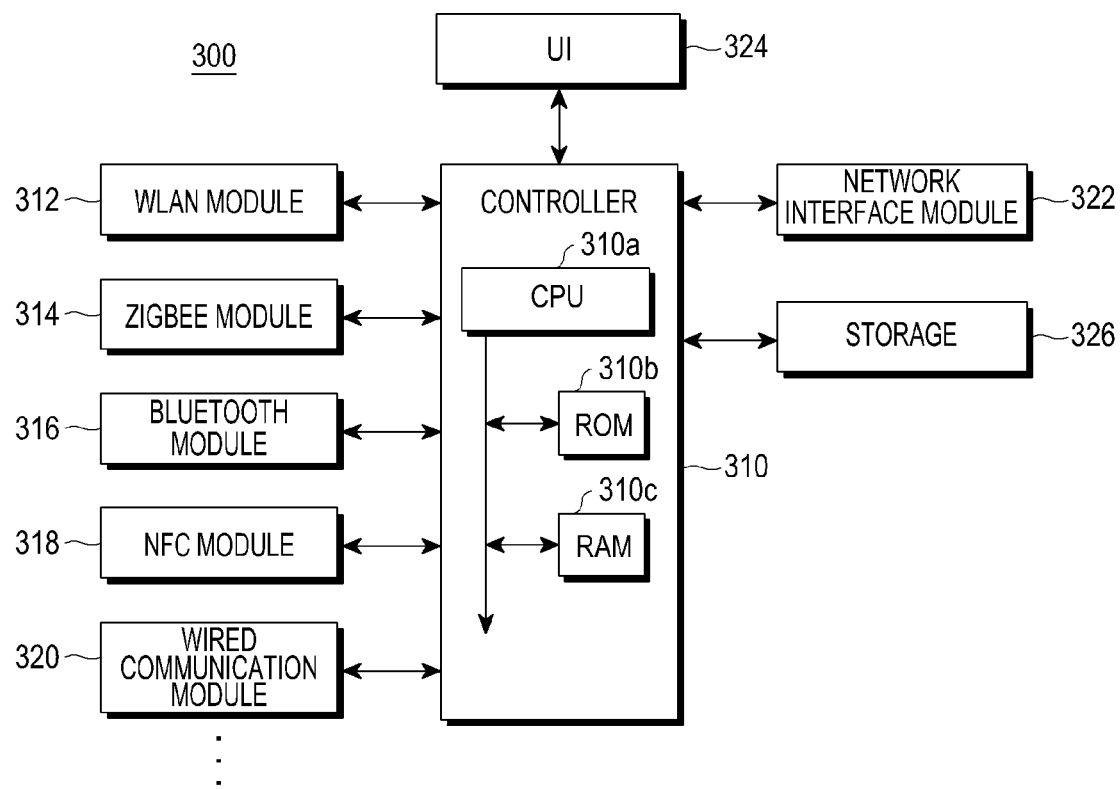
FIG. 3 is a schematic diagram illustrating a structure of a Home Gateway (HGW) according to an embodiment of the present disclosure.

FIG. 3 is a block diagram illustrating a structure of an HGW according to an embodiment of the present disclosure. The HGW may include at least one of illustrated components illustrated in FIG. 3.

Referring to FIG. 3, a HGW 300 is connected with home devices (not illustrated) by using at least one communication modules 312 to 320. The communication modules 312 to 320 include at least one of various wireless or wired communication protocol-based modules, such as a Wireless Local Area Network (WLAN) module 312 such as WiFi, a ZigBee module 314, a Bluetooth® module 316, a Near-Field Communication (NFC) module 318, and a wired communication module 320. The HGW 300 may include a controller 310, a network interface module 322, a User Interface (UI) 324, and a storage 326.

The controller 310 may include a Central Processing Unit (CPU) 310a, a Read-Only Memory (ROM) 310b having stored therein a control program for controlling the HGW 300, and a Random Access Memory (RAM) 310c used as a memory region for a task performed in the HGW 300. The controller 310 communicates with the home devices through the communication modules 312 to 320 by execution of programs stored in the ROM 310b or the RAM 310c or application programs that may be stored in the storage 326, and generates a control command to send the control command to the home devices or stores information collected from the home devices in the storage 326.

The UI 324 may include an output module such as a display, a speaker, an indication lamp, or the like, and an input module such as a touch screen, a keypad, a microphone, or the like. The UI 128 may be used for a user to directly control the HGW 300, register or delete the home devices in or from the HGW 300, or control the home devices through the HGW 300.

The network interface module 322 may be, for example, an Internet communication module and connects the HGW 300 to an external network.

The storage 326 is configured to store program codes, data, or information needed for operations of the HGW 300 under control of the controller 310, and may also store voluminous data delivered from external devices or the home devices when necessary.

Figure 4:
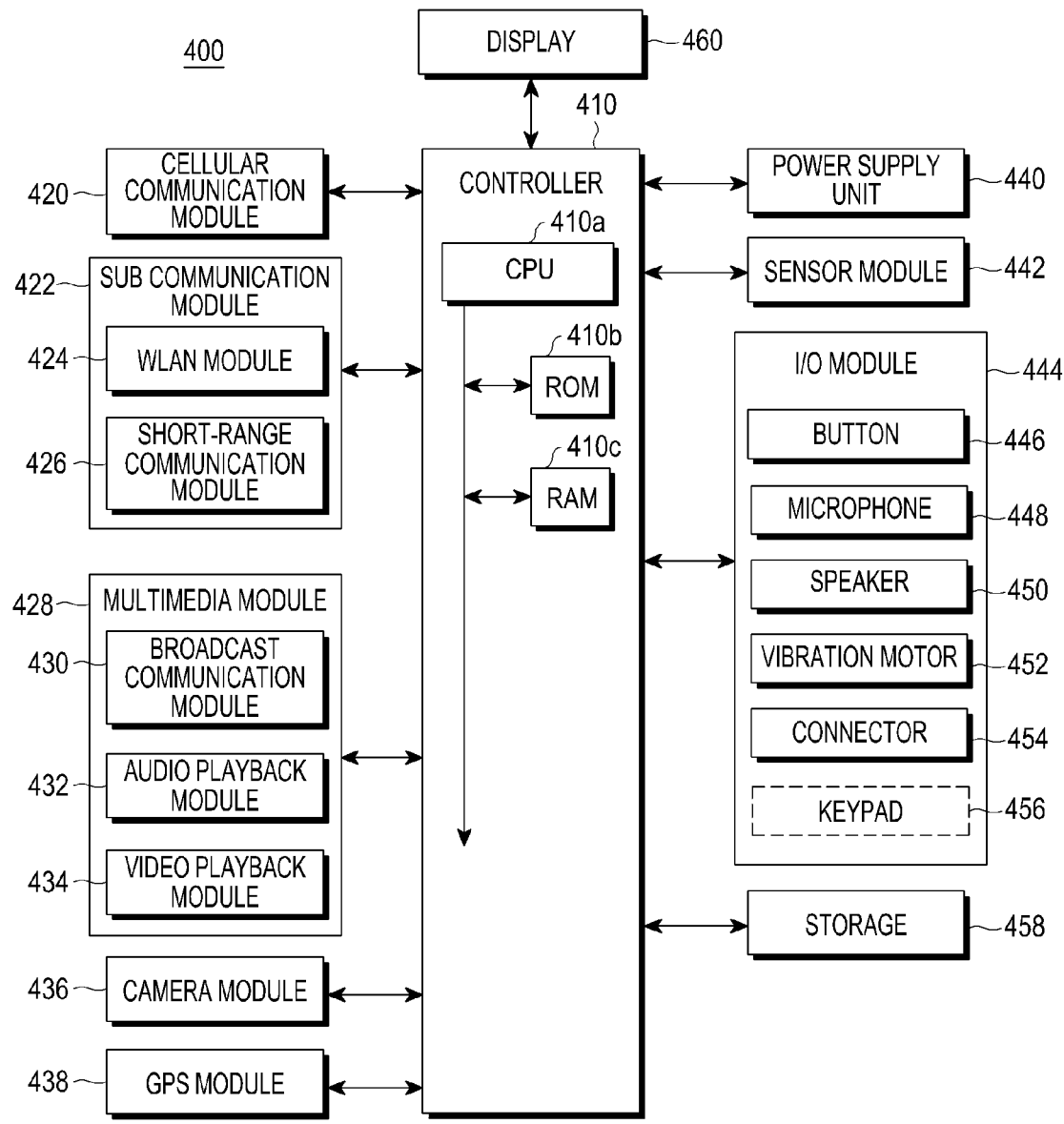
FIG. 4 is a block diagram illustrating a structure of a mobile terminal according to an embodiment of the present disclosure.

FIG. 4 is a block diagram illustrating a structure of a mobile terminal according to an embodiment of the present disclosure.

The mobile terminal may include at least one of components illustrated in FIG. 4.

Referring to FIG. 4, a mobile terminal 400 may include a controller 410, a cellular communication module 420, a sub communication module 422, a multimedia module 428, a camera module 436, a Global Positioning System (GPS) module 438, an input/output module 444, a sensor module 442, a storage 458, a power supply unit 440, and at least one display module 460. The sub communication module 422 may include at least one of a WLAN module 424 and a short-range communication module 426, and the multimedia module 428 may include at least one of a broadcast communication module 430, an audio playback module 432, and a video playback module 434. The camera module may include at least one camera, and the input/output module 444 may include at least one of a button set 446, a microphone 448, a speaker 450, a vibration motor 452, a connector 454, and a keypad 456.

The controller 410 may include a CPU 410a, a ROM 410b having stored therein a control program for controlling the mobile terminal 400, and a RAM 410c that memorizes a signal or data input from outside the mobile terminal 400 or is used as a memory region for a task performed in the mobile terminal 400, and the controller 410 controls the other components of the mobile terminal 400.

The cellular communication module 420 uses a wireless access technique based on a cellular communication protocol under control of the controller 410 to allow the mobile terminal 400 to be connected to an external device (in particular, a base station of a cellular system) via at least one or a plurality of antennas (not illustrated). The cellular communication module 420 transmits/receives a wireless signal including voice communication, video communication, a Short Messaging Service (SMS) message, or a Multimedia Messaging Service (MMS) message to/from other devices capable of performing communication. The cellular communication module 420 transmits/receives short data for controlling an application or the like.

The WLAN module 424 connects to the Internet in a place where a wireless Access Point (AP, not illustrated) is installed, under control of the controller 410. The short-range communication module 426 wirelessly performs short-range communication between the mobile terminal 400 and an external device under control of the controller 410. Short-range communication may include, for example, Bluetooth®, ZigBee, Infrared Data Association (IrDA), and so forth.

The display module 460 may include a touch screen that displays information of various applications (for example, call, data transmission, broadcasting, a camera, or the like) executable by the controller 410 and provides a UI configured correspondingly. The controller 410 allows a soft key displayed on the touch screen to be selected or executes an application or a function corresponding to the soft key in response to a user gesture sensed on the touch screen. The user gesture may include a touch by a finger or a tool, recognition of a motion of a human body, and so forth.

In the home network system structured as described above, a user may desire to continuously watch contents (for example, a movie, music, video, and so forth, and hereinafter, referred to as "contents"), which are currently played in a mobile terminal, in a home device (for example, a TV). Moreover, in the home network system, the user watching a movie stored in a HGW through a mobile terminal may desire to continuously watch that movie on the TV. In this case, the user accesses the HGW by using the mobile terminal or a computing device of the user to control at least one of registered home devices through the HGW. To this end, an optimal environment needs to be created in advance.

There are four ways to create the optimal environment in advance.

The first way is that the HGW accurately determines locations of home devices in physical or logical terms. That is, the HGW determines physical locations of the home devices that may be configured for each space such as a living room, a study room, an inner room, or the like. The HGW determines logical addresses of the home devices, such as IP, ZigBee, Bluetooth®, and the like, for short-range wireless communication.

The second way is that the HGW determines what environment is needed to create the optimal environment in advance. Automatic environment setting and manual environment setting may be used.

In automatic environment setting, the user may directly register, for example, a smart TV, an Internet TV, a light, a speaker, and the like in the HGW in advance. In the following description, the TV such as a smart TV, an Internet TV, or the like will be referred to as a "television". As an example of automatic environment setting, a device may recommend a contents-specific optimal view environment.

Manual environment setting registers a contents-specific possible environment. For example, for high-resolution contents, a home device supporting a high resolution may be selected, and for low-resolution contents, a home device supporting a low resolution may be selected.

In manual environment setting, a user sets an optimal environment for the user because some devices may not be provided in user's home.

The third way is that the HGW notifies the mobile terminal of an environment that may hinder contents viewing to create the optimal environment in advance. For example, contents viewing may be disturbed by noise of a laundry machine, such that the HGW notifies the mobile terminal of a laundry finish time or the like in advance. For a phone, the HGW requests the mobile terminal to set a silent mode in advance. For a robot vacuum cleaner, the HGW checks a scheduled time of the robot vacuum cleaner and notifies the mobile terminal of the scheduled time. The HGW determines whether there is any overlap with a personal schedule input in various information apparatuses and notifies the mobile terminal of the result.

The fourth way is that the mobile terminal provides a mode on a controllable device basis to create the optimal environment in advance. For example, if the mobile terminal is a smart phone or a tablet computer, it downloads a corresponding application. If a television is a smart TV, the mobile terminal directly executes the application on the smart TV to manipulate the smart TV with a remote controller.

As stated previously, the optimal environment is created in advance and initialization between a home device and the HGW is performed as described below.

Figure 5:
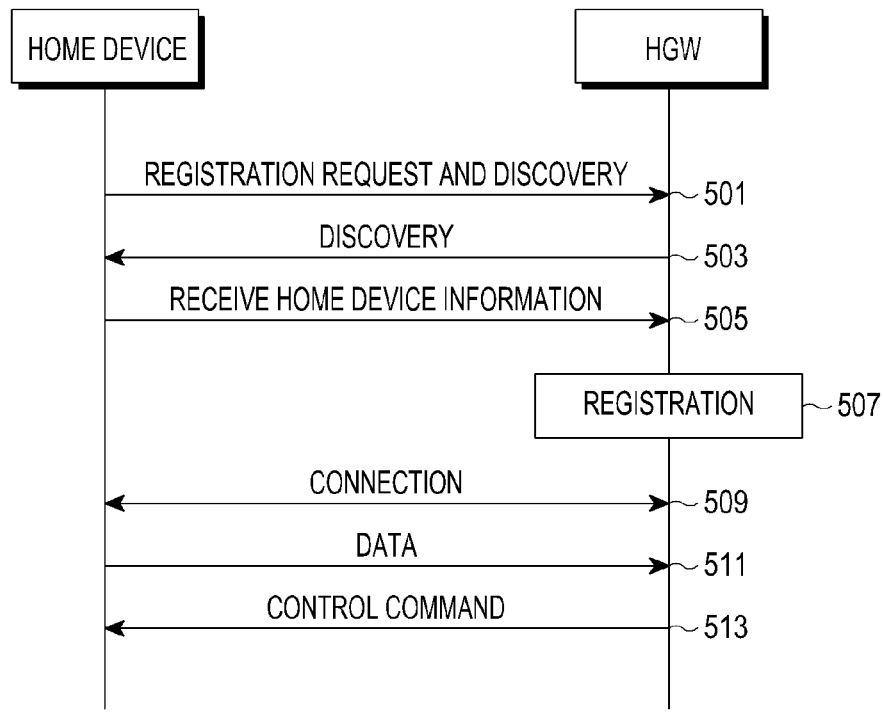
FIG. 5 is a ladder diagram illustrating initialization between a home device and a HGW according to an embodiment of the present disclosure.

FIG. 5 is a ladder diagram illustrating initialization between a home device and a HGW according to an embodiment of the present disclosure.

Once a home device is installed, power is initially supplied. A newly or previously installed home device sends a registration request message for requesting registration and/or a discovery request message to the HGW in step 501. The HGW performs a discovery procedure for the home device in step 503. For example, if the home device is Wi-Fi connected to the HGW, the HGW may perform a discovery procedure for a neighboring new device periodically or at the request of a user. If the home device is detected by the HGW through the discovery procedure, the HGW receives a registration response message including information about the home device from the home device in response to the registration request message in step 505. The information about the home device may include at least one of an identifier of the home device, capacity information of the home device, and state information of the home device. Upon receiving the information about the home device from the home device in step 505, the HGW completes registration of the home device therein in step 507. Also in step 507, the HGW completes registration by storing the information about the home device and manages the corresponding home device as a registered or selected home device.

In step 509, the HGW establishes connection with the home device. Establishing the connection may be performed in a procedure determined based on WiFi, ZigBee, Bluetooth®, NFC, or a wired communication, depending on a communication method between the HGW and the home device. Once the connection is established between the HGW and the home device, the home device transmits data to the HGW through the established connection in step 511. In step 513, if necessary, the HGW sends a control command to the home device.

Figure 6:
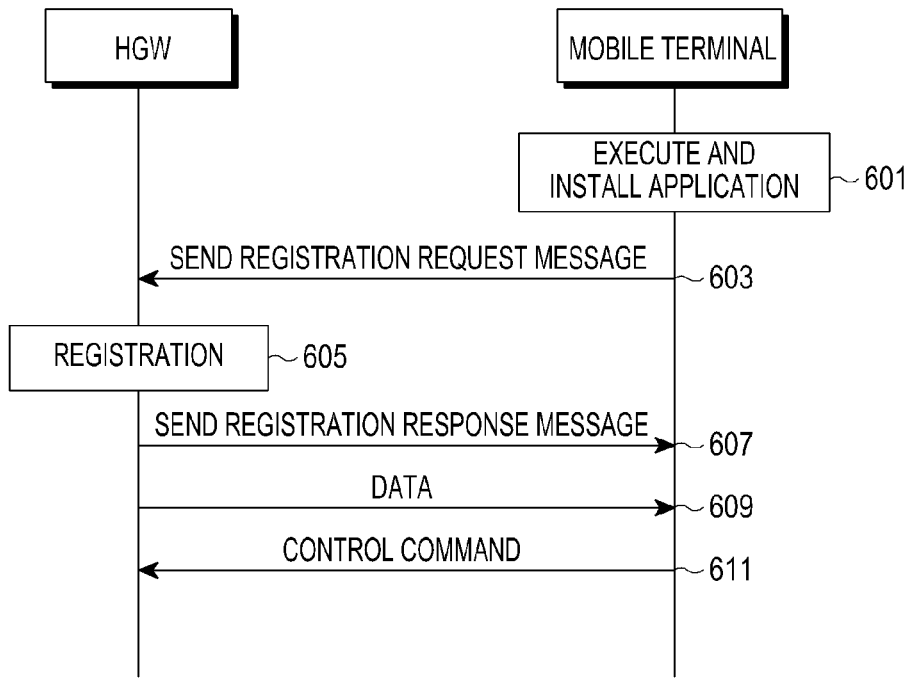
FIG. 6 is a ladder diagram illustrating registration between a mobile terminal and a HGW according to an embodiment of the present disclosure.

FIG. 6 is a ladder diagram illustrating registration between a mobile terminal and a HGW according to an embodiment of the present disclosure.

Referring to FIG. 6, the mobile terminal executes and installs an application that enables communication with the HGW in step 601. The application may be limited to be installed in a mobile terminal of a user who has passed a predetermined authorization procedure. The HGW provides an authentication number, and the HGW, a manufacturer server of the HGW, or a providing server of the application permits downloading of the application for a mobile terminal of a user who inputs the authentication number. The mobile terminal executes the application and sends a registration request message to the HGW through the application in step 603. The application may be delivered to the HGW over the Internet or directly to the HGW through Wi-Fi. The registration request message may include at least one of an identifier of the mobile terminal (for example, an MS Identifier (MSID) or an International Mobile Subscriber Identify (IMSI)), a login ID and password, authority information, and mode information.

In step 605, the HGW stores information about the mobile terminal and manages the mobile terminal as a registered or selected mobile terminal. In step 607, the HGW send a registration response message indicating that the information about the mobile terminal has been successfully registered to the mobile terminal.

In step 609, if necessary, the HGW transmits data needed for a movie mode according to an embodiment of the present disclosure to the mobile terminal. In step 611, if necessary, the mobile terminal sends a control command for the HGW or at least one home device to the HGW.

After the foregoing operations are performed in advance, contents may be played according to an embodiment of the present disclosure.

Figure 7:
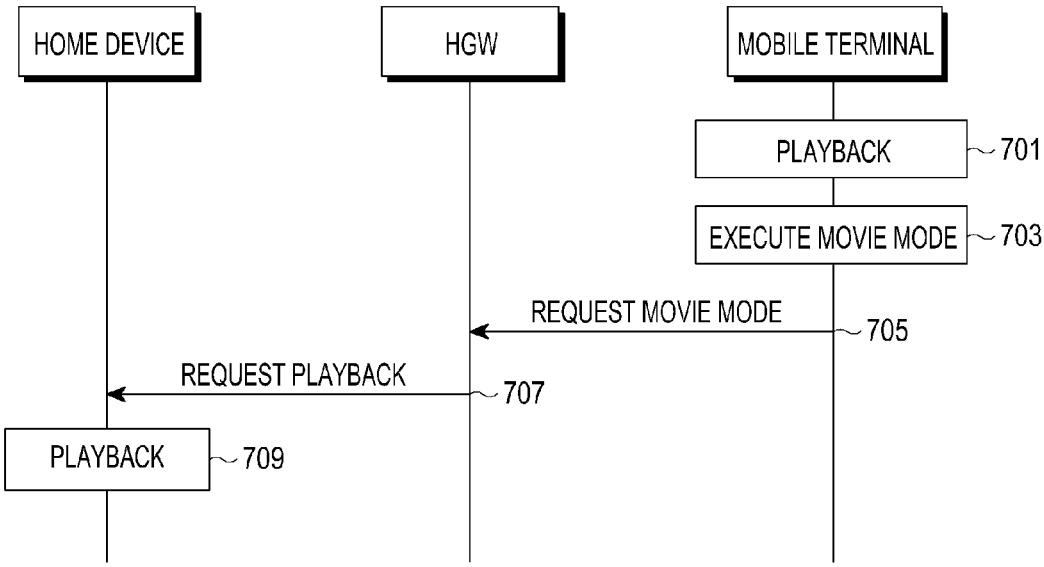
FIG. 7 is a ladder diagram illustrating a method for playing contents in a home network system according to a first embodiment of the present disclosure.

FIG. 7 is a ladder diagram illustrating a method for playing contents in a home network system according to a first embodiment of the present disclosure.

The first embodiment of the present disclosure proposes a scheme for continuously playing contents, which are currently played in the mobile terminal, in a home device, for example, a television. In a possible embodiment, the contents played in the mobile terminal may be contents stored in the mobile terminal. In another possible embodiment, the contents played in the mobile terminal may be streaming contents received from an external server.

In step 701, the mobile terminal is playing contents. Upon sensing user's selection of a movie mode, the mobile terminal executes the movie mode in step 703.

Home devices may be controlled depending on setting of the movie mode or a type of contents. For example, if the contents are a movie, the mobile terminal may turn "ON" the television and the home theater, and turn "OFF" the light through the movie mode at the request of the user. If the contents are music, the mobile terminal may turn "OFF" the television and turn "ON" the home theater and the light through the movie mode at the request of the user.

The mobile terminal requests the movie mode from the HGW in step 705. Requesting the movie mode from the HGW may be performed by the mobile terminal sending a movie mode request message to the HGW. The HGW requests playback from the home device in step 707. The home device may be, for example, a television. The home device plays the contents played in the mobile terminal at the request of the HGW in step 709.

Figure 8:
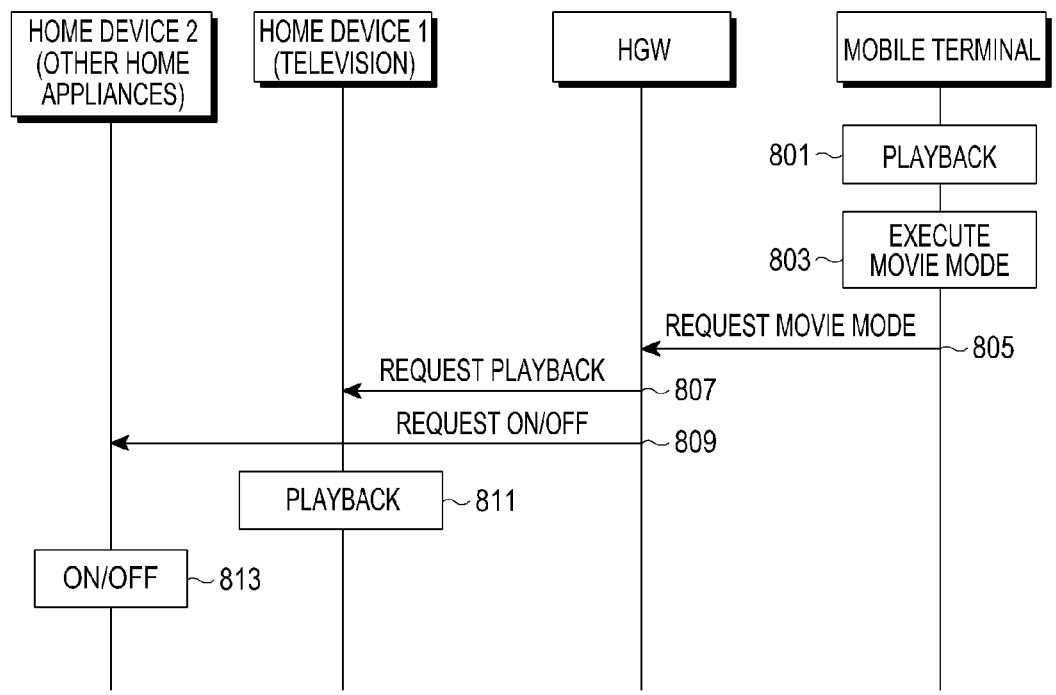
FIG. 8 is a ladder diagram illustrating a method for playing contents in a home network system according to a sub embodiment of a first embodiment of the present disclosure.

FIG. 8 is a ladder diagram illustrating a method for playing contents in a home network system according to a sub embodiment of the first embodiment of the present disclosure.

The sub embodiment of the first embodiment of the present disclosure proposes a scheme for playing contents, which are currently played in a mobile terminal, for example, on a television and controlling other electronic devices at a time. In a possible embodiment, contents played in a mobile terminal may be contents stored in the mobile terminal. In another possible embodiment, contents played in a mobile terminal may be streaming contents received from an external server.

In step 801, the mobile terminal is playing contents. Upon sensing user's selection of the movie mode, the mobile terminal executes the movie mode in step 803.

Home devices may be controlled depending on setting of the movie mode or a type of contents. For example, if the contents are a movie, the mobile terminal may turn "ON" the television and the home theater and turn "OFF" the light through the movie mode at the request of the user. If the contents are music, the mobile terminal may turn "OFF" the television and turn "ON" the home theater and the light through the movie mode at the request of the user.

In step 805, the mobile terminal requests the movie mode from the HGW. Requesting the movie mode from the HGW may be performed by the mobile terminal sending a movie mode request message to the HGW. Then, the HGW requests playback from Home Device 1 in step 807. Home Device 1 may be, for example, a television. The HGW requests playback from Home Device 1 in step 807. Home Device 1 may be, for example, a television. The HGW requests "ON/OFF" from Home Device 2 in step 809. Home Device 2 may be, for example, a home theater or a light, and steps 807 and 809 may be performed at the same time or step 809 may be performed prior to step 807. The "ON/OFF" request of step 809 is an example of a control command of the home device.

At the request of the HGW, Home Device 1 continuously plays the contents, which are currently played in the mobile terminal, in step 811, and Home Device 2 controls "ON/OFF" in step 813. When Home Device 2 controls "ON/OFF", it may mean that Home Device 2 turns "ON" the home theater and turns "OFF" the light. Steps 811 and 813 may be performed at the same time, and step 813 may be performed prior to step 811. In another possible embodiment, the HGW may sense a location of the user. The HGW may control Home Device 1 and Home Device 2 illustrated in FIG. 8, respectively, depending on the user's location. For example, if the user moves from the living room to the inner room, the HGW may turn "OFF" the television located in the living room, turn "OFF" the home theater located in the living room, and turn "OFF" the light located in the living room. The HGW nay also turn "ON" the light located in the inner room and turn "ON" the TV located in the inner room.

In another embodiment, when the user moves out of home with the mobile terminal, contents, which are currently played in home, may be continuously played in the mobile terminal even if the user moves out of home.

Figure 9:
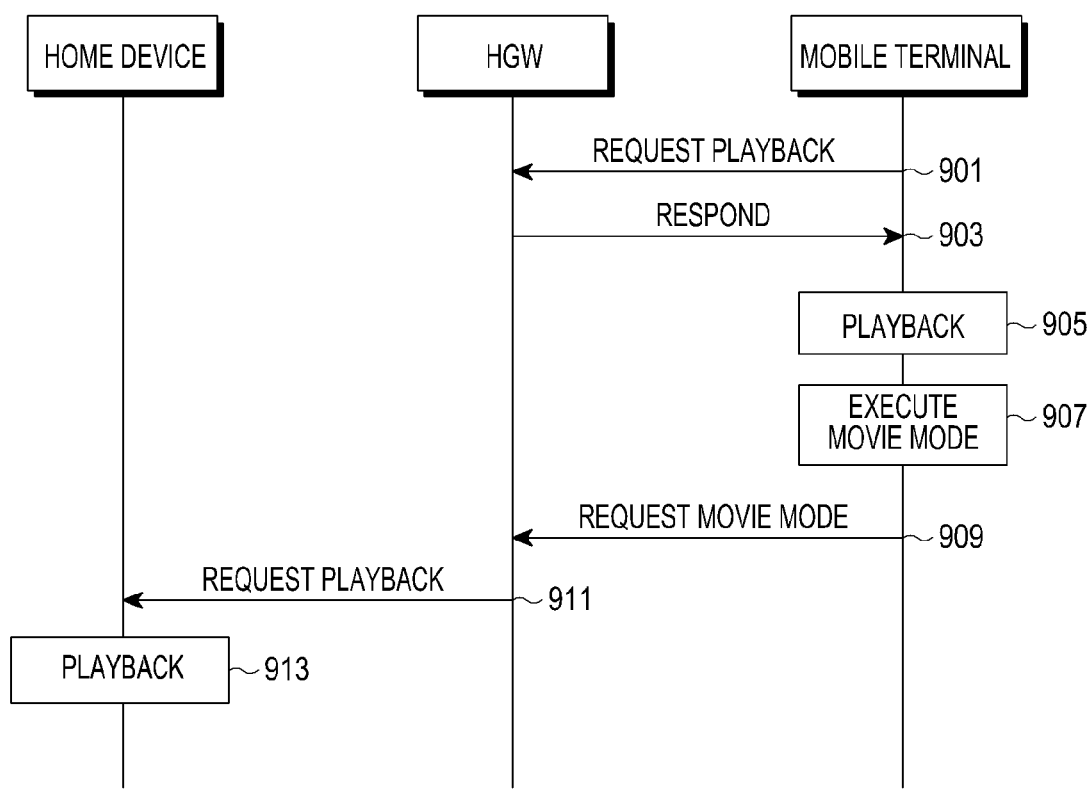
FIG. 9 is a ladder diagram illustrating a method for playing contents in a home network system according to a second embodiment of the present disclosure.

FIG. 9 is a ladder diagram illustrating a method for playing contents in a home network system according to a second embodiment of the present disclosure.

The second embodiment of the present disclosure provides a method in which during playback of contents stored in the HGW, in the mobile terminal, if the movie mode is executed, the contents played in the mobile terminal are played on the television. An example of the contents stored in the HGW may include contents stored in the HGW. Another example of the contents stored in the HGW may include charged contents provided on the Internet TV.

In step 901, the mobile terminal makes a request to the HGW, for playback of contents stored in the HGW. In step 903, the HGW delivers its stored contents to the mobile terminal in response to the request. In step 905, the mobile terminal plays the contents received from the HGW. Upon sensing user's selection of the movie mode during playback of the contents, the mobile terminal executes the movie mode in step 907.

Home devices may be controlled depending on setting of the movie mode or a type of contents. For example, if the contents are a movie, the mobile terminal may turn "ON" the television and the home theater and turn "OFF" the light through the movie mode at the request of the user. If the contents are music, the mobile terminal may turn "OFF" the television and turn "ON" the home theater and the light through the movie mode at the request of the user.

The mobile terminal requests the movie mode from the HGW in step 909. Requesting the movie mode from the HGW may be performed by the mobile terminal sending a movie mode request message to the HGW. The HGW then requests playback from the home device in step 911. The home device may be, for example, a television. The home device then plays the contents, which are currently played in the mobile terminal, at the request of the HGW in step 913.

Figure 10:
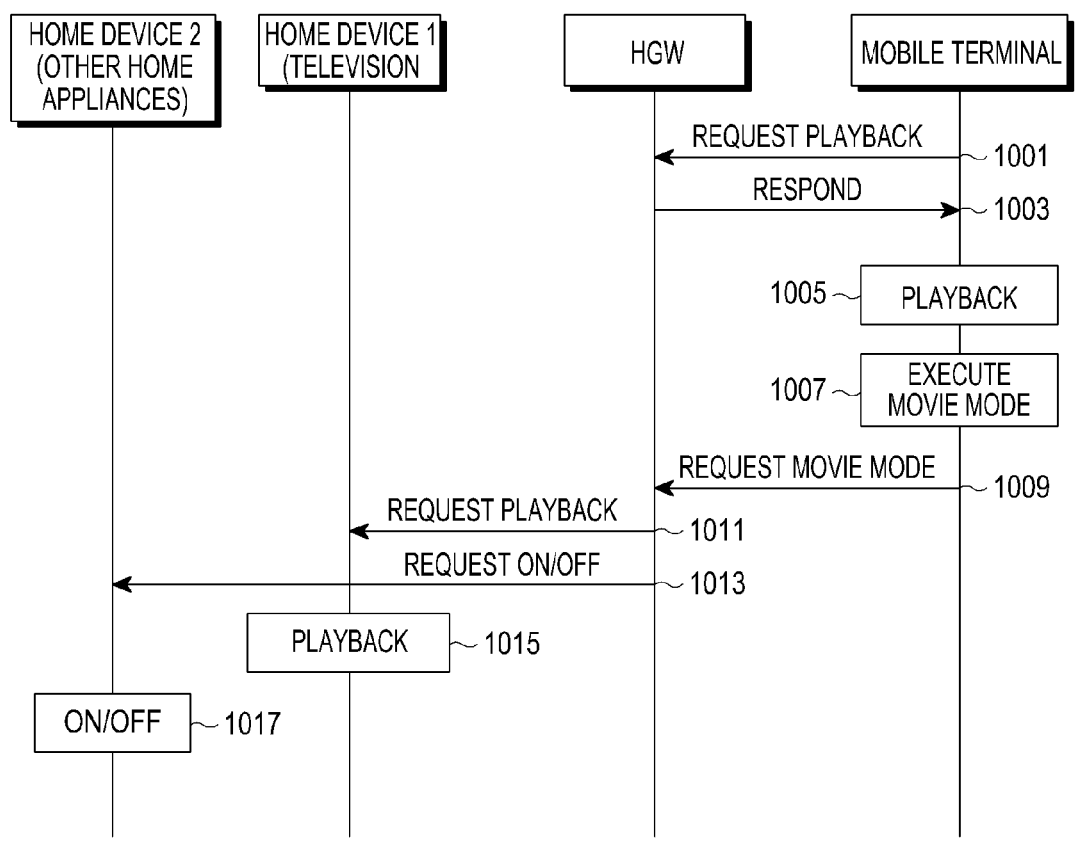
FIG. 10 is a ladder diagram illustrating a method for playing contents in a home network system according to a sub embodiment of a second embodiment of the present disclosure.

FIG. 10 is a ladder diagram illustrating a method for playing contents in a home network system according to a sub embodiment of a second embodiment of the present disclosure.

The sub embodiment of the second embodiment of the present disclosure proposes a scheme for playing contents stored in the HGW on the television and controlling other home appliances at a time.

The mobile terminal makes a request, to the HGW, for playback of contents stored in the HGW in step 1001. The HGW transmits its stored contents to the mobile terminal in response to the request in step 1003. In step 1005, the mobile terminal plays the contents received from the HGW. During playback of the contents, upon sensing user's selection of the movie mode, the mobile terminal executes the movie mode in step 1007.

Home devices may be controlled depending on setting of the movie mode or a type of contents. For example, if the contents are a movie, the mobile terminal may turn "ON" the television and the home theater and turn "OFF" the light through the movie mode at the request of the user. If the contents are music, the mobile terminal may turn "OFF" the television and turn "ON" the home theater and the light through the movie mode at the request of the user.

The mobile terminal requests the movie mode from the HGW in step 1009. Requesting the movie mode from the HGW may be performed by the mobile terminal sending a movie mode request message to the HGW. The HGW requests playback from Home Device 1 in step 1011. Home Device 1 may be, for example, a television.

The HGW requests "ON/OFF" from Home Device 2 in step 1013. Home Device 2 may be, for example, a home theater or a light. Steps 1011 and 1013 may be performed at the same time, and step 1013 may be performed prior to step 1011. The "ON/OFF" request of step 1013 is an example of a control command of the home device.

Home Device 1 plays contents, which are currently played in the mobile terminal, at the request of the HGW in step 1015, and Home Device 2 controls "ON/OFF" in step 1017. When Home Device 2 controls "ON/OFF", it may mean that Home Device 2 turns "ON" the home theater and turns "OFF" the light. Steps 1015 and 1017 may be performed at the same time and step 1017 may be performed prior to step 1015.

Figure 11:
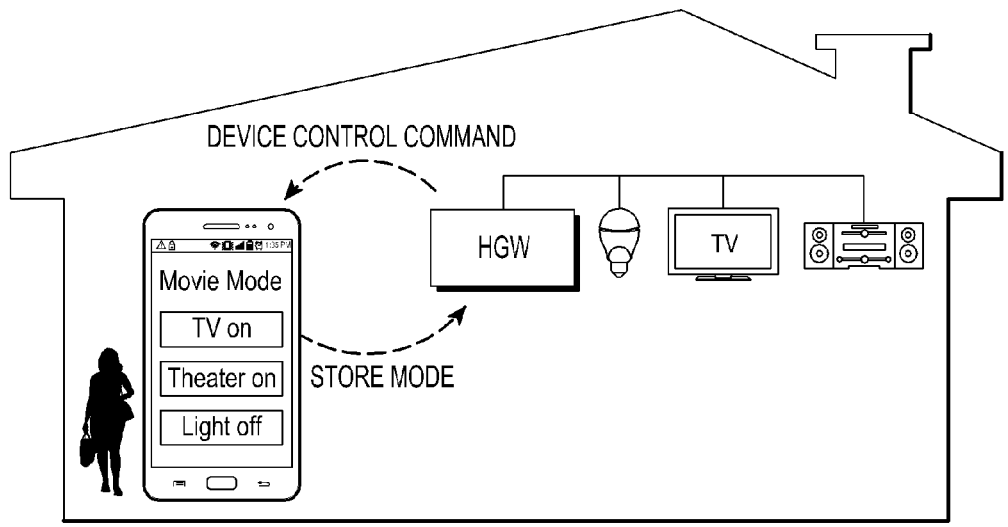
FIG. 11 is a diagram illustrating a home network system that supports a movie mode according to an embodiment of the present disclosure.

FIG. 11 is a diagram illustrating a home network system that supports a movie mode according to an embodiment of the present disclosure.

Referring to FIG. 11, the home network system may include a HGW, a home device, and a mobile terminal.

The HGW performs the following operations to control home devices at a time for a certain situation, as set by the user in the mobile terminal. The HGW is connected with home devices in home and stores information about home devices connected to the home network. Upon receiving a movie mode request message from the mobile terminal, the HGW generates a control command message (or a device control command) and sends the message or command to the respective home devices.

The HGW controls available home devices. For example, if the home device is a television, the HGW may allow user-direct manipulation or automatic setting with respect to "ON/OFF" and an image-genre-specific optimal screen configuration (various screen components such as contrast, contrast.)

For example, if the home device is an audio device, the HGW may perform user-direct manipulation or automatic setting with respect to ON/OFF and an optimal sound quality configuration based on an image genre and a music genre (a frequency equalizer, selection of a speaker to be used from among multiple speakers, volume, and various sound effect functions).

The HGW may control "ON/OFF" if the home device is a Digital Versatile Disc (DVD) player, and may control "ON/OFF" or "increase/decrease" the intensity of light if the home device is a desk lamp or a light.

The home devices include home appliances in home and are connected through a home network. The home device operates upon receiving a control command message from the HGW. For example, if the home device is a television, upon receiving a control command message of turning "ON" the television, the television may be turned "ON" and play contents. If the home device is a light, upon receiving a control command message of turning "OFF" the light, the light may be turned "OFF". If the home device is a home theater, upon receiving a control command message of turning "ON" the home theater, the home theater may be turned "ON".

Figure 12:
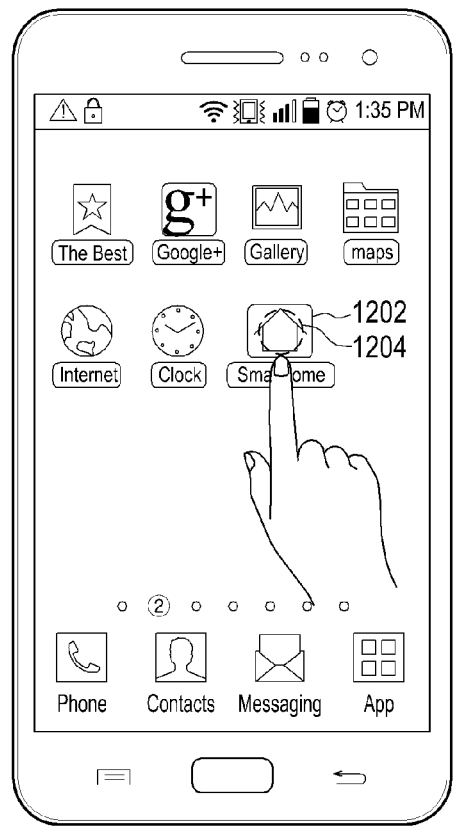
FIG. 12 is a diagram illustrating a User Interface (UI) for execution of a movie mode in a mobile terminal for supporting the movie mode according to an embodiment of the present disclosure.

FIG. 12 is a diagram illustrating terminal UI for execution of a movie mode in a mobile terminal supporting the movie mode according to an embodiment of the present disclosure.

As shown in FIG. 12, the mobile terminal provides an icon 1202 for executing an application installed therein, and executes management smart home application upon sensing a user gesture 1204, for example, a touch, on the icon 1202. In another embodiment, the mobile terminal may provide an icon for input of a voice command, and upon sensing a user gesture on the icon and receiving the voice command, for example, "Smart home", then the mobile terminal may execute the smart home application. The UI shown below may also change depending on a type of a mobile terminal, characteristics of the mobile terminal, and so forth.

Figure 13:
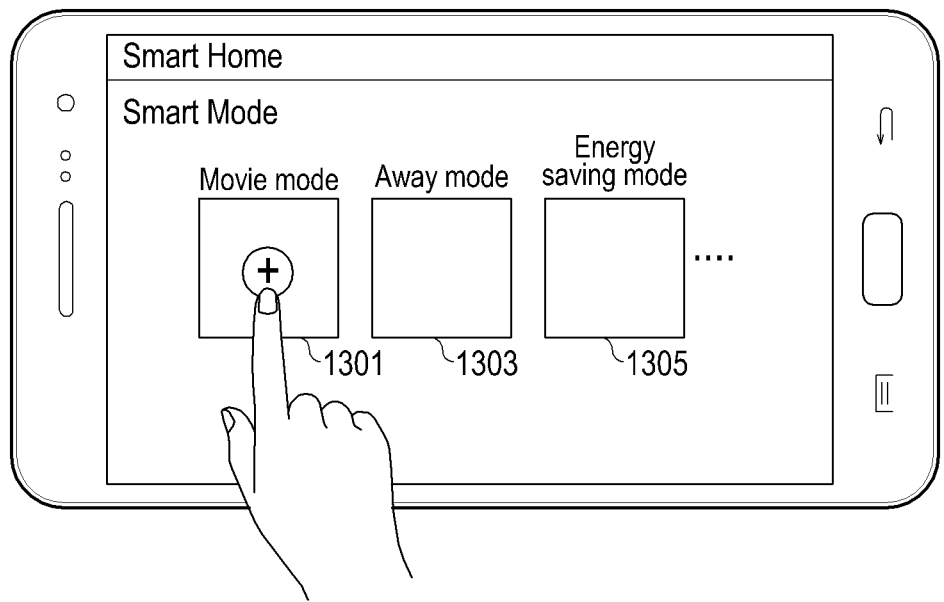
FIG. 13 is a diagram illustrating a UI for a movie mode of a movie mode application according to an embodiment of the present disclosure, as a continuous operation of FIG. 12.

FIG. 13 is a diagram illustrating a UI for a movie mode of a movie mode application according to an embodiment of the present disclosure, as a continuous operation of FIG. 12.

Upon sensing user's selection of a smart home application, the mobile terminal provides a smart mode icon as illustrated in FIG. 13. The smart mode icon may include a movie mode icon 1301, an away mode icon 1303, and an energy saving mode icon 1305. The away mode and the energy saving mode are not much related to the subject matter of the present disclosure and thus will not be described in detail.

In the movie mode illustrated in FIG. 13, contents having played in the mobile terminal or contents stored in the HGW are played in a home device according to an embodiment of the present disclosure. Upon sensing a movie mode touch, the mobile terminal may provide a UI for execution of the movie mode as illustrated in FIG. 14.

Figure 14:
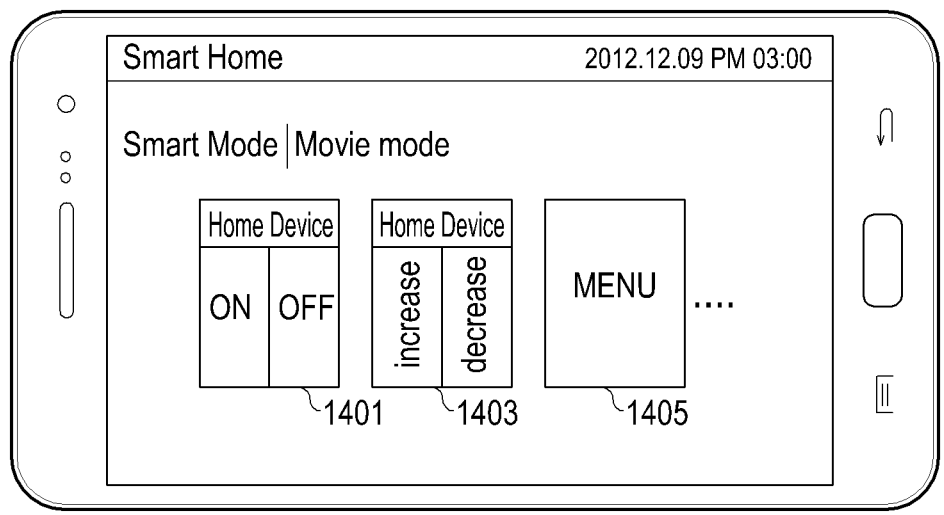
FIG. 14 is a diagram illustrating a UI for a movie mode of a movie mode application according to an embodiment of the present disclosure, as a continuous operation of FIG. 13.

FIG. 14 is a diagram illustrating a UI for a movie mode of a movie mode application according to an embodiment of the present disclosure, as a continuous operation of FIG. 13.

Referring to FIG. 14, upon sensing a movie mode touch on an icon, the mobile terminal displays an ON/OFF icon 1401 for "ON/OFF" control of the home devices, an "increase/decrease" icon 1403 for controlling "increase/decrease" of the capacity of the home device, and a menu icon 1405 capable of variously setting the movie mode in advance. The "increase/decrease" icon 1403 may be expressed, for example, as "+/−". The mobile terminal may then sense a touch on the ON/OFF icon 1401 for an operation of a television, a home theater, or a light as will be described with reference to FIG. 15, and a touch on the "increase/decrease" icon 1403 for a capacity of a home theater or a light (for example, sound of the home theater and the intensity of the light) as will be described with reference to FIG. 16.

Figure 15:
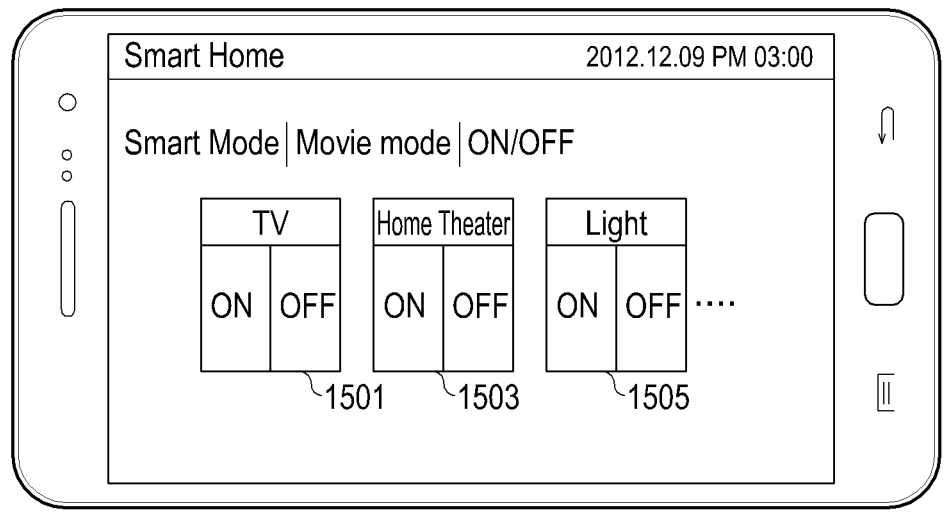
FIG. 15 is a diagram illustrating a UI for a movie mode of a movie mode application according to an embodiment of the present disclosure, as a continuous operation of FIG. 14.

FIG. 15 is a diagram illustrating a UI for a movie mode of a movie mode application according to an embodiment of the present disclosure, as a continuous operation of FIG. 14.

Referring to FIG. 15, upon sensing a touch on the ON/OFF icon 1401, the mobile terminal displays icons (for example, a television, a home theater, a light, and so forth) for controlling "ON/OFF" of the home devices. If the mobile terminal senses an "ON" touch 1501 for a television, senses an "OFF" touch 1505 for a light, and senses an "ON" touch 1503 for a home theater depending on user's selection (or a type of contents), the mobile terminal sends a movie mode request message to the HGW through wired/wireless Internet. Then, the HGW controls the television to be turned "ON", controls the home theater to be turned "ON", and controls the light to be turned "OFF" in response to the movie mode request message.

Figure 16:
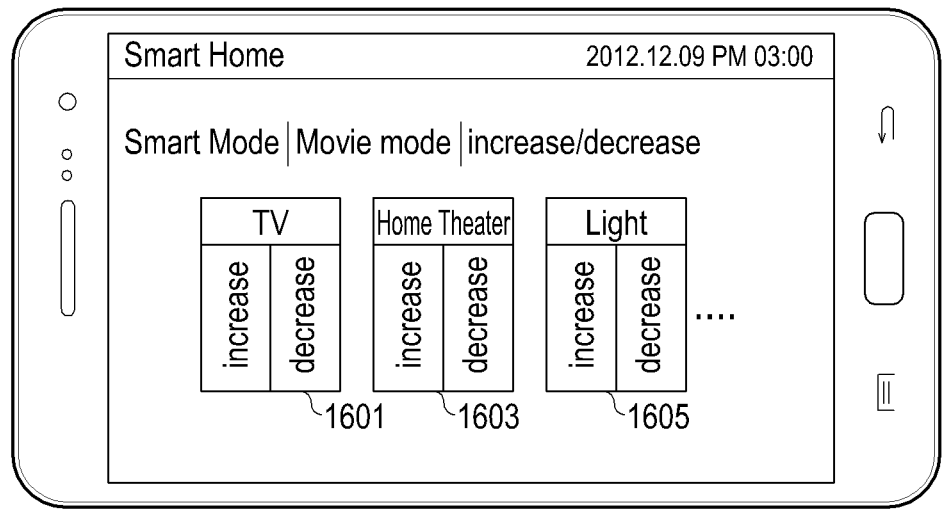
FIG. 16 is a diagram illustrating a UI for a movie mode of a movie mode application according to an embodiment of the present disclosure, as a continuous operation of FIG. 14.

FIG. 16 is a diagram illustrating a UI for a movie mode of a movie mode application according to an embodiment of the present disclosure, as a continuous operation of FIG. 14.

Upon sensing a touch on the "increase/decrease" icon 1403, the mobile terminal displays an icon for controlling "increase/decrease" of the home devices as illustrated in FIG. 16. The "increase/decrease" icon of FIG. 16 may be expressed as "+/−". If sensing a "decrease" touch 1601 for the television, a "decrease" touch 1605 for the light, and an "increase" touch 1603 for the home theater, the mobile terminal sends a movie mode request message to the HGW through wired/wireless Internet. The HGW then may control the television to, for example, "decrease" the volume, control the home theater to, for example, "increase" the volume, and control the light to, for example, "decrease" the light, in response to the movie mode request message.

Figure 17:
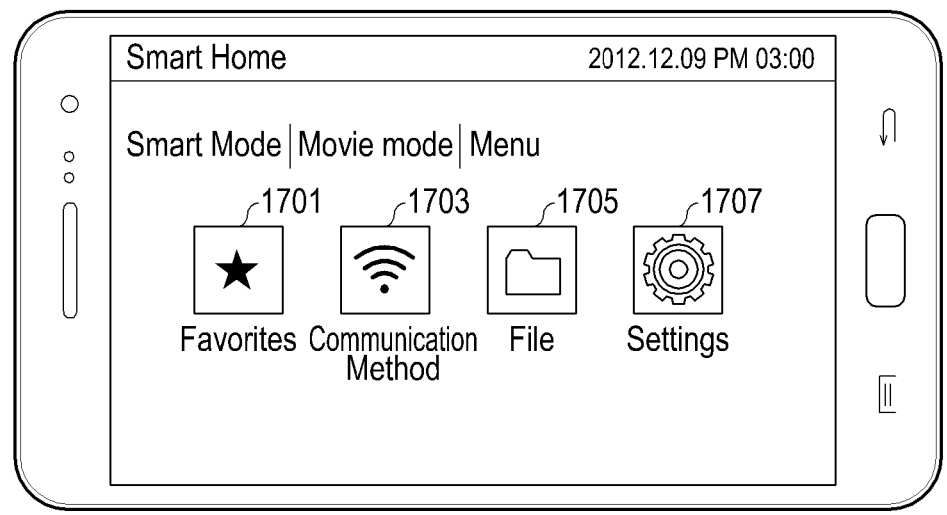
FIG. 17 is a diagram illustrating a UI for a movie mode of a movie mode application according to an embodiment of the present disclosure, as a continuous operation of FIG. 14.

FIG. 17 is a diagram illustrating a UI for a movie mode of a movie mode application according to an embodiment of the present disclosure, as a continuous operation of FIG. 14.

Referring to FIG. 17, upon sensing a touch on the menu icon 1405, the mobile terminal may provide icons such as Favorites 1701, Communication Method 1703, File 1705, and Settings 1707 for use of a home network service.

The Favorites 1701 is an icon for providing a frequently used mode, a recently used mode, and all modes that have been used so far.

The Communication Method 1703 is an icon for selecting one of Wi-Fi, ZigBee, Bluetooth®, NFC, and 3G/LTE.

The File 1705 is an icon used to retrieve contents stored in the mobile terminal when the contents stored in the mobile terminal are used.

The Settings 1707 is an icon for allowing the user to directly set an environment for a movie mode service according to an embodiment of the present disclosure. As an example of environment setting, the user may manually set the state of each home device while viewing contents in the movie mode through the mobile terminal.

The mobile terminal stores various modes. The movie mode according to an embodiment of the present disclosure includes a process of configuring a mode and, although not shown in the drawings, a process of editing the mode.

A method for configuring the movie mode is as described below.

To configure the movie mode, the HGW determines a range of a home device. That is, the HGW removes home devices that are not related to contents viewing. The home devices that are not directly related to contents viewing may include, for example, a power measurer, a camera, a laundry machine, a phone, a vacuum cleaner, and so forth.

When the movie mode is configured, "ON/OFF" of each device and a particular function of a device may be reinforced. For example, a volume may be increased, a light may be intensified, or a temperature of an air conditioner may be lowered.

On the other hand, "ON/OFF" of each device and a particular function of a device may be weakened. For example, the volume may be reduced, the light may be weakened, or the temperature of the air conditioner may be raised.

When the movie mode is configured, the movie mode may be stored in advance. For example, the movie mode may be stored in the HGW or the mobile terminal.

When the movie mode is configured, an authority for movie mode configuration may be assigned for another mobile terminal.

The movie mode may also be configured such that a temporary authority may be assigned and initialization may be performed if the mobile terminal having stored the movie mode therein is lost or a password is lost in a password-set mode.

A description will now be made of a method for editing the movie mode.

A movie mode configuration wizard icon may be provided. The movie mode configuration wizard icon may perform an edition operation in an expert mode allowing selection of a detailed function of a home device and a beginner mode allowing setting of a mode recommended by a device step-by-step.

When the movie mode is edited, various icons and background screens may be provided to configure a mode screen according to user's tastes.

Figure 18:
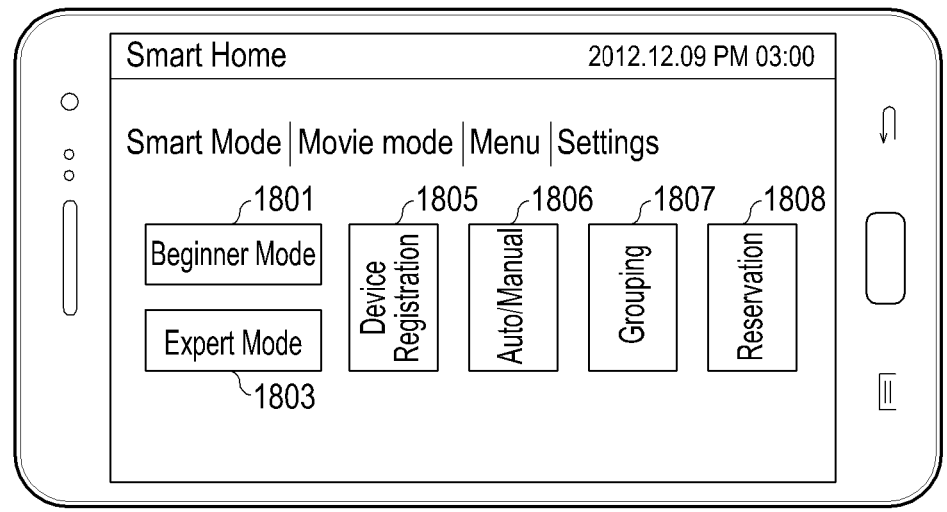
FIG. 18 is a diagram illustrating a UI for a movie mode of a movie mode application according to an embodiment of the present disclosure, as a continuous operation of FIG. 17.

FIG. 18 is a diagram illustrating a UI for a movie mode of a movie mode application according to an embodiment of the present disclosure, as a continuous operation of FIG. 17.

Referring to FIG. 17, upon sensing an environment setting touch, the mobile terminal provides a beginner mode icon 1801/an expert mode icon 1803 to allow the user to select a beginner mode or an expert mode, provides a device registration icon 1805 for selecting/registering a home device list, and provides an automatic/manual icon 1807 for automatically or manually switching to the movie mode when the user comes into the home from outside while watching contents. The mobile terminal also provides a grouping icon 1809 for setting group-controlling with respect to the movie mode, and provides a reservation icon 1811 to notify the user prior to a reserved time if the movie mode is reserved, and to execute the movie mode if the user does not cancel the reservation. The reservation icon 1811 reserves contents that have not yet been uploaded in the market, and notifies the mobile terminal if the contents are uploaded in the market. In group-controlling, the HGW needs to authenticate the user to determine whether the user has an authority for group-controlling. In group-controlling, the mobile terminal may group and control user-desired home devices among available home devices. In group-controlling, the mobile terminal may generate a device-specific control item as one icon for execution by single selection.

In group-controlling, the mobile terminal senses that setting of group-controlling for a particular operation mode is requested from the user, and generates a control list including home devices to be controlled and functions of the home devices or generates control list generation information, based on information input from the user with respect to the requested operation mode. Herein, the control list generation information refers to information needed for the HGW to generate a control list. The generated control list or control list generation information is delivered from the mobile terminal to the HGW.

Figure 19:
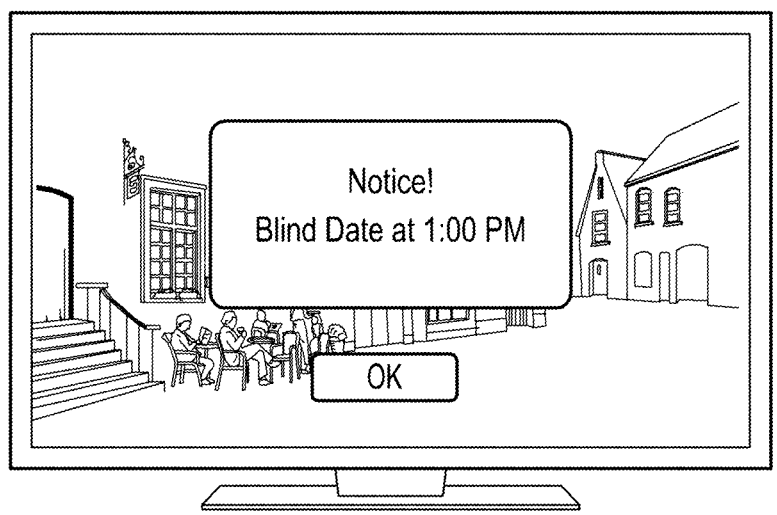
FIG. 19 is a diagram illustrating a UI showing an example of a home device that plays contents in a home network system according to a third embodiment of the present disclosure.

FIG. 19 is a diagram illustrating a UI showing an example of a home device that plays contents in a home network system according to a third embodiment of the present disclosure.

The third embodiment of the present disclosure proposes a method for stopping playback of contents on a television to display a meeting schedule with a friend on a pop-up window, as an additional operation of the first and second embodiments of the present disclosure. Thus, a personal schedule may be efficiently managed.

The present disclosure may control multiple devices depending on a type of contents in a home network system.

The present disclosure may also control multiple devices at a time in a home network system.

The present disclosure may display a meeting schedule on a pop-up window during playback of a movie to help personal schedule management in a home network system.

Various substitutions, modifications, and changes may be made by those of ordinary skill in the art without departing from the technical spirit of the present disclosure described above, and therefore, the present disclosure is not limited and defined by the foregoing embodiments and the attached drawings.

What is claimed is:

1. A method for controlling playback of contents by a home gateway (HGW) in a home network system, the method comprising:

receiving, from a mobile terminal on a network external to the HGW, a control command related to playback of the contents, the contents being played in the mobile terminal;

identifying a type of the contents based on the control command;

determining a plurality of home devices and an operation scheme of the plurality of home devices based on the type of the contents; and controlling the determined plurality of the home devices based on the operation scheme.

2. The method of claim 1, wherein the HGW senses a location of a user who uses the mobile terminal.

3. The method of claim 2, wherein the controlling of the determined plurality of the home devices comprises controlling the determined plurality of the home devices depending on the location of the user.

4. The method of claim 1, wherein the HGW controls a display device among the determined plurality of the home devices to continuously play the contents that are currently played in the mobile terminal, and wherein the HGW controls the display device to display a pop-up window for a preset schedule alarm during playback of the contents on the display device.

5. A method for controlling playback of contents by a home gateway (HGW) in a home network system, the method comprising:

receiving, from a mobile terminal, a control command related to playback of the contents, the contents being stored in the HGW;

identifying, by the HGW, a type of the contents based on the control command;

determining a plurality of home devices and an operation scheme of the plurality of home devices based on the type of the contents; and controlling the determined plurality of the home devices based on the operation scheme.

6. The method of claim 5, wherein the HGW senses a location of a user who uses the mobile terminal.

7. The method of claim 6, wherein the controlling of the determined plurality of the home devices comprises controlling the determined plurality of the home devices depending on the location of the user.

8. The method of claim 5, wherein the HGW controls a display device among the determined plurality of the home devices to play contents stored in the HGW, and wherein the HGW controls the display device to display a pop-up window for a preset schedule alarm during playback of the contents on the display device.

9. An apparatus for controlling playback of contents by a home gateway (HGW) in a home network system, the apparatus comprising:

a receiver configured to receive, from a mobile terminal on a network external to the HGW, a control command related to playback of the contents, the contents being played in the mobile terminal; and at least one processor configured to:
identify a type of the contents based on the control command,
determine a plurality of home devices and an operation scheme of the plurality of home devices based on the type of the contents, and
control the determined plurality of the home devices based on the operation scheme.

10. The apparatus of claim 9, wherein the HGW senses a location of a user who uses the mobile terminal.

11. The apparatus of claim 10, wherein the at least one processor is configured to control the determined plurality of the home devices depending on the location of the user.

12. The apparatus of claim 9, wherein the HGW controls a display device among the determined plurality of the home devices to continuously play the contents that are currently played in the mobile terminal, and wherein the HGW controls the display device to display a pop-up window for a preset schedule alarm during playback of the contents on the display device.

13. An apparatus for controlling playback of contents by a home gateway (HGW) in a home network system, the apparatus comprising:

a receiver configured to receive, from a mobile terminal, a control command related to playback of the contents, the contents being stored in the HGW; and at least one processor configured to:
identify a type of the contents based on the control command within the HGW,
determine a plurality of home devices and an operation scheme of the plurality of home devices based on the type of the contents, and
control the determined plurality of the home devices based on the operation scheme.

14. The apparatus of claim 13, wherein the HGW senses a location of a user who uses the mobile terminal.

15. The apparatus of claim 14, wherein the at least one processor is further configured to control the determined plurality of the home devices depending on the location of the user.

16. The apparatus of claim 13, wherein the HGW controls a display device among the determined plurality of the home devices to play contents stored in the HGW, and wherein the HGW controls the display device to display a pop-up window for a preset schedule alarm during playback of the contents on the display device.

* * * * *